Oct. 11, 1955 — F. P. SCULLY — 2,720,216
FITTING FOR CARRYING SIGNALLING AND GAUGING UNITS
Filed March 4, 1953 — 3 Sheets-Sheet 1
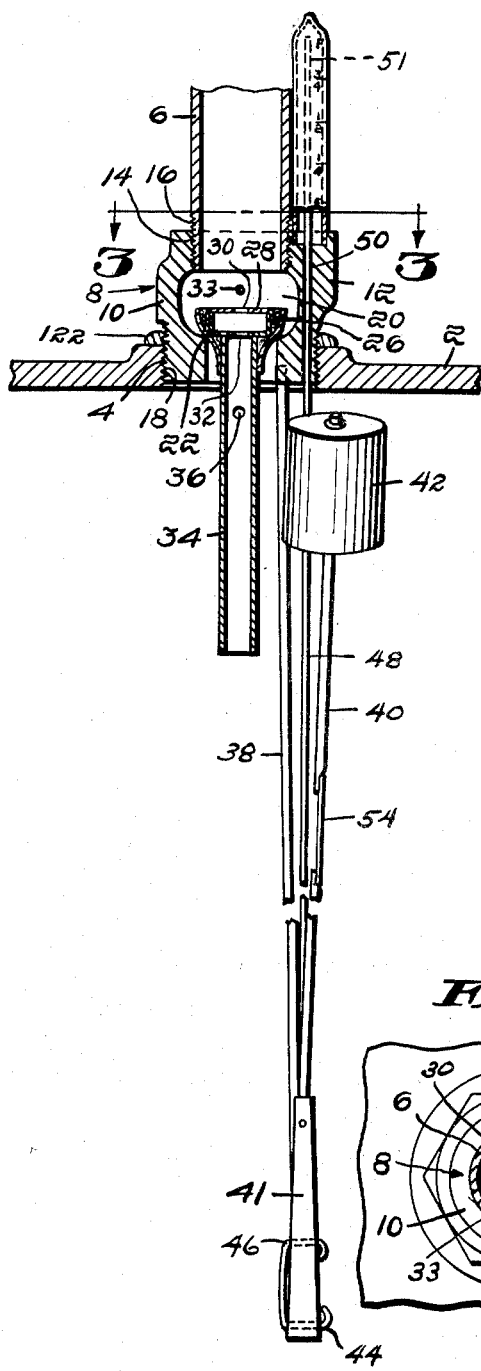
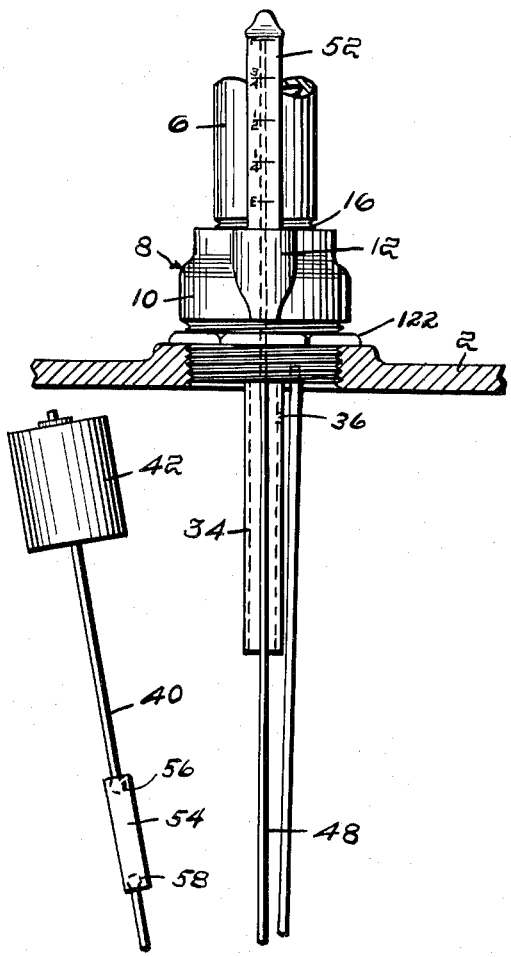
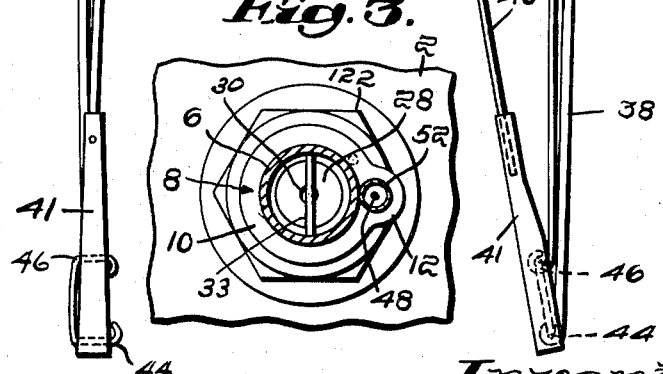
Inventors:
Frank P. Scully,
by Cadbury Cluttick Attorney Oct. 11, 1955 F. P. SCULLY 2,720,216
FITTING FOR CARRYING SIGNALLING AND GAUGING UNITS
Filed March 4, 1953 3 Sheets-Sheet 2
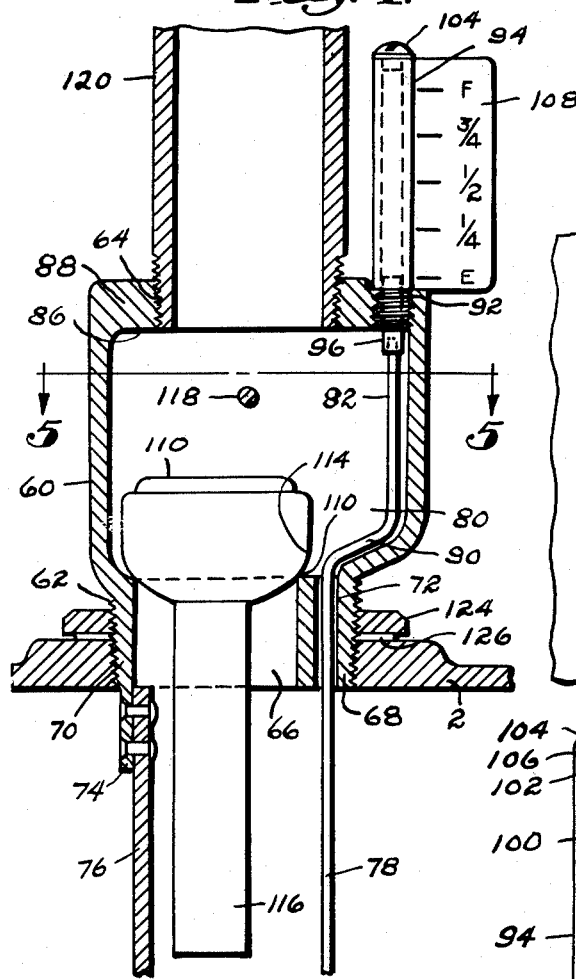
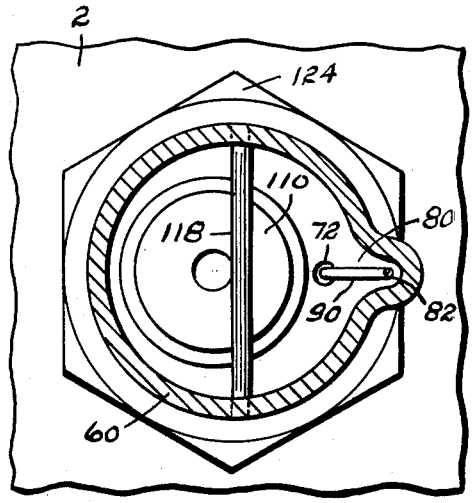
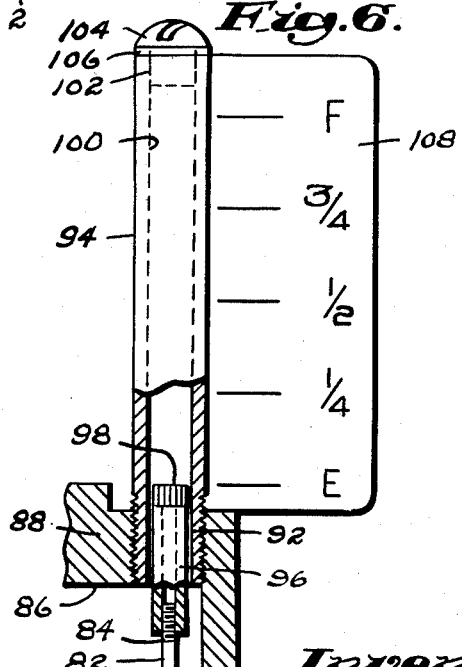
Inventors:
Frank P. Scully,
by Yardley Chittick
Attorney Oct. 11, 1955  F. P. SCULLY  2,720,216
FITTING FOR CARRYING SIGNALLING AND GAUGING UNITS
Filed March 4, 1953  3 Sheets-Sheet 3
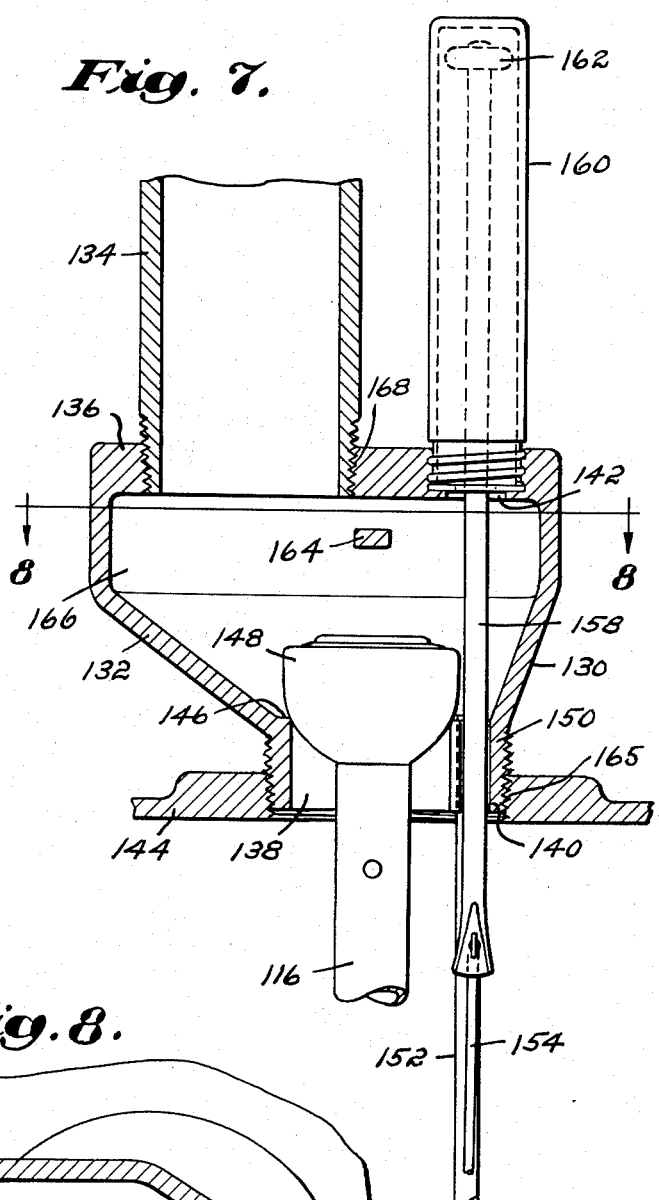
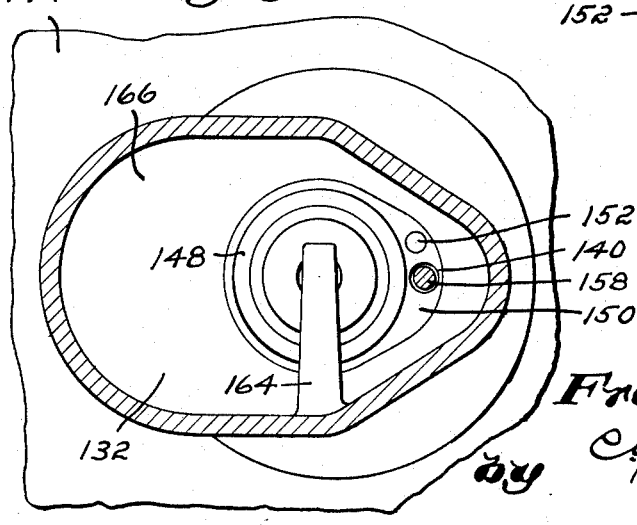
Inventor:
Frank P. Scully,
by Hadley Chittick
Attorney

United States Patent Office 2,720,216
Patented Oct. 11, 1955

2,720,216

FITTING FOR CARRYING SIGNALLING AND GAUGING UNITS

Frank P. Scully, Belmont, Mass., assignor to Scully Signal Company, Melrose, Mass., a corporation of Massachusetts Application March 4, 1953, Serial No. 340,255

14 Claims. (Cl. 137—558)

This application is a continuation-in-part of the application of Frank P. Scully et al., Serial No. 83,345, filed March 25, 1949, for Combined Signalling and Gauging Unit, now abandoned.

The invention disclosed and claimed herein relates to the housing or fitting which acts as a mounting or support for a whistling signal and a visual gauging element. The fitting which constitutes this invention is designed to be positioned between a tank and a vent pipe leading therefrom to the atmosphere so that the whistling signal and gauging element both of which are supported thereby may function in their normal manner to be heard and/or seen by the operator.

While the present invention may be used with any type of closed tank, it has been especially designed in the forms shown herein for use with a conventional household fuel oil tank. The invention will be described in relation to such tank but it will be understood that the unit will have equal use with closed tanks designed for other purposes.

Heretofore, it has been customary in the household fuel tank field to provide the tank with a fill pipe through which the fuel oil is delivered to the tank, a vent pipe through which displaced gas escapes, a signalling whistle positioned in the vent pipe line for giving an indication when the liquid level has risen to a predetermined point, and a gauge for providing a visual indication of the level.

The gauge customarily has been inserted in a separate opening. Thus, it has been necessary that fuel oil tanks, up to the present, be provided with at least three openings—a fill opening, a vent opening, and a gauge opening. Applicant, by the present invention, has provided a new and novel fitting acting as a housing and support to provide means for combining in a single instrument, or unit, an audible signalling device and a visual gauge so that the said unit may be inserted and mounted in the vent opening, thus eliminating the need for a third opening, heretofore required. The construction is such that it is unnecessary to make any change in the dimensions of the standard vent opening; that is, the fitting carrying the whistle and gauge may be positioned in the opening and secured by the usual screw threads in the conventional manner.

The invention also contemplates the provision of means whereby the unit may be locked in position with the indicator and float mechanism facing in the proper direction even though the tank and unit threads have not been set up tightly.

These and other objects of the invention will become more apparent as the description proceeds with the aid of the accompanying drawings in which Fig. 1 shows one form of the invention partly in cross-section, secured in position in the vent opening at the top of a tank.

Fig. 2 is a view looking from the right of Fig. 1 with the unit and vent pipe in side elevation.

Fig. 3 is a horizontal section on the line 3—3 of Fig. 1.

Fig. 4 is a vertical section of a modified form of the invention.

Fig. 5 is a section on the line 5—5 of Fig. 4.

Fig. 6 is an enlarged section of the upper end of the gauge rod and indicator scale plate.

Fig. 7 is a vertical section of a modified form of fitting which functions in the manner of the forms shown in Figs. 1 to 5.

Fig. 8 is a section on the line 8—8 of Fig. 7.

Referring to the form shown in Figs. 1, 2 and 3, the top of a conventional tank is indicated at 2, having a reinforced threaded opening 4 of standard dimensions. This opening is the vent opening and ordinarily, in the absence of any signal or indicator, would be directly connected with vent pipe 6.

The instrument or unit, which includes the subject of this invention is indicated generally at 8. The unit comprises a housing or fitting 10, generally circular in cross-section except for a boss or lateral extension 12, the purpose of which will hereinafter be explained. The upper end of the housing is interiorly threaded at 14 to receive corresponding threads 16 of vent pipe 6. The lower exterior of housing 10 is threaded at 18 for engagement with threads 4. The interior 20 of the body of the housing is generally circular in horizontal cross-section with the lower part being of gradually reduced diameter, terminating in a valve seat 22. On this seat rests an audible signalling device which consists of a whistle carrier and valve 26, generally hemispherical in shape and supporting a button type whistle 28 having upper and lower apertures 30 and 32. A cross bar 33 limits upward movement of the audible signalling device.

Depending from the carrier and whistle is an intrusion tube 34 in series with the whistle. The length of the intrusion tube is determined by the liquid level at which a signal is to be given. An auxiliary aperture 36 is provided in the upper part of the intrusion tube to permit continued escape of gas through the whistle after the intrusion tube 34 has been trapped by rising liquid.

The audible signalling device just described is that now in common use and shown in the United States patent to Mathey, Reissue No. 22,391. This device functions in the following manner. Liquid entering the tank displaces gas which passes through the intrusion tube and whistle to the vent pipe 6, and thence to the atmosphere. The whistle sounds continuously until the liquid level reaches and traps the lower end of intrusion tube 34. At this point, the whistle ceases and the operator is advised that it is time to cut off the supply. Any gas still under pressure after trapping may escape through aperture 36. Due to the distortion of the gas flow when flowing only through aperture 36, the whistle will not sound. If pressure in the tank becomes excessive at any time, valve 26 of the whistle unit will be forced upwardly from seat 22 to provide additional venting capacity. Thus, by using a signalling device of the type herein disclosed that gives a sound during filling, with a sound change occurring at the time the liquid level has risen to a predetermined point, the user, even if out of sight of the tank but within hearing range, will know that liquid is entering the tank, that the tank is sealed and that the displaced gas is being vented properly.

Firmly secured to the bottom of housing 10 is a downwardly extending rod 38 designed to support the gauge. The gauge mechanism consists of an arm 40 and extension 41, having a conventional cork float 42 on one end and pivoted at the other end at 44 to rod 38. A short distance from pivot 44 along rod extension 41 is a second pivot 46 to which is connected a vertically extending gauge rod 48. The upper end of this rod passes freely through a vertical bore 50 in the body 10 and associated lateral extension 12. Obviously, as the rod 40 may be swung in a vertical arc about pivot 44, gauge rod 48 will be caused to move in a vertical direction, the movement being substantially harmonically related to the arcuate movement of float 42.

The upper end 51 of rod 48 extends above housing 10 and is covered by a transparent cylindrical closed tube 52 which is suitably marked to indicate, by the related position of the end 51 of rod 48, the liquid level in the tank over the range of movement of float 42. Thus, there is provided a visual indication of the level of liquid in the tank.

The length of arm 40 will normally be greater than one-half the width of the tank with which the gauge will be used. Thus, for example, if installation should be attempted while the tank is approximately half full, the arm 40, supported approximately horizontally by float 42, would be rotated along with housing 10. Float 42 would immediately engage the side of the tank preventing further rotation of housing 10. Installation, however, can be readily made if the tank is nearly empty or nearly full in which case arm 40 would not hit the tank side. Another method of installation is to hold arm 40 in elevated position as shown in Figs. 1 and 2 by some temporary restraining means while the unit is being screwed in place. A third method makes use of an intermediate spring 54 in arm 40 secured at its ends 56 and 58. This spring permits lateral bending of the float arm should it hit the side of the tank while the housing is being screwed to position.

In Figs. 4, 5 and 6 is shown a modified form of the invention. This construction is designed to permit the installation of a unit in a smaller tank opening than would be possible with the construction shown in Figs. 1 and 2. The housing 60 is threaded externally at its lower end at 62 and internally at its upper end at 64. Threads 62 and 64 may or may not be co-axial to meet particular requirements. The lower end of the casing has a circular passage 66 therethrough which is offset with respect to threads 62 and results in the bottom wall being thicker at one side, as at 68, than at the other side 70. This thickened portion provides the necessary material for a gauge rod passage 72. The supporting rod 76 may be attached to the housing adjacent the gauge rod passage 72 in the same manner as disclosed in Fig. 1, or if preferred, it may be connected to an extension 74 which hangs downwardly from the opposite side 70 as illustrated in Fig. 4. The lower end of supporting rod 76 carries a float arm similar to arm 40 and the usual linkage as shown in Figs. 1 and 2 to actuate gauge rod 78.

Passage 66, while non co-axial with the lower end of the housing, presents an effective venting area substantially equivalent to that of the vent pipe that is connected to the upper end of the housing.

The interior area of housing 60 extends laterally over and beyond opening 72 as at 80 to provide a space into which the offset portion 82 of gauge rod 78 may be positioned. The upper end 84 of the gauge rod terminates a short distance below the underside 86 of the casing top 88. The purpose of this arrangement is to permit the assembly of the casing and gauge rod in the following manner. The lower end of gauge rod 78 is inserted through the top opening of casing 60 and then downwardly through hole 72 until the offset portion 90 limits further downward movement. At this point it will be possible to swing the end 84 under the lip 86 to the position shown.

Immediately above upper end 84 is an opening 92 in the top of the casing which is screw threaded to receive a transparent tubular cover 94. However, prior to screwing cover 94 in place an internally threaded extension 96 is applied to the upper threaded end 84 of the gauge rod. The upper end of extension 96 is long enough to be above the casing as at 98 when the gauge rod is in its lowermost position. With the parts thus arranged, cover 94 is then screwed in place to protect the end of the gauge rod and at the same time to allow it to move freely up and down by virtue of the sufficiently large bore 100.

In the present disclosure the upper end of cover 94 is threaded internally at 102 to receive the screw 104, adapted to secure a horizontal ear 106 of the indicator scale plate 108, thus maintaining the latter in position.

Offset opening 66 at its upper edge forms a seat 110 adapted to receive the audible signalling unit assembly in which the whistle is indicated at 112, the valve portion at 114 and the intrusion tube at 116. This assembly functions in the same manner as the whistle unit shown in Figs. 1 and 2.

Supporting rod 76 and gauge rod 78 straddle the intrusion tube 116 as shown in Fig. 4, but this in no way interferes with the normal operation of the whistle assembly, and similarly the action of the float arm and gauge rod is unaffected.

A crossbar 118 extends transversely of the housing to limit upward movement of the whistle assembly. Thus, if pressure in the tank increases unduly or if overflow should occur, the uppermost position of the whistle will not restrict the available venting capacity through the housing below the normal venting capacity of the connected vent pipe 120.

The construction of Figs. 1 and 2 may be used with a tank having a two inch opening while the construction of Figs. 4 and 5 may be used with a one and one-half inch opening. Thus, the standard openings found in conventional present day tanks are adapted to receive the combined signalling and gauging unit without the use of adapters or other modifications. As the housing is screwed into the tank and tight, set up position of the threads is approached, rotation of the housing should be stopped when the indicator plate faces the proper direction and the float arm is in position to swing in a vertical arc parallel to the long axis of the tank. If, at this final position, the threads have not been set up fully tight, which is likely to be the case, a loose casing and leaking threads might result. Therefore, in order that the casing indicator plate and float arm may be secured in the proper position without complete tightening of the threads, there is provided a locknut which in Figs. 1, 2 and 3 is indicated at 122, and in Figs. 4 and 5 at 124. If desired, a gasket providing additional security may be interpositioned between the locknut and the tank top as at 126 in Fig. 4.

A modification of the invention is shown in Figs. 7 and 8. In this construction which, however, functions in exactly the same manner as those forms shown in Figs. 1 to 6, the housing is modified so that the vent pipe is off-set with respect to the entrance passage from the tank, while the passages through the bottom and top of the housing for the gauge rod are aligned.

In Figs. 7 and 8, the housing 130, screwed to tank top 144 in the usual manner is off-set to the left as at 132 so that the vent pipe 134 threaded to the top of the housing 136 is laterally disposed a substantial amount with respect to the entrance passage 138 at the bottom of the housing. Adjacent passage 138 is the lower gauge rod passage 140 which is axially aligned with the upper gauge rod opening 142. The off-set disposition of vent pipe 134 with respect to the threaded, tank connected lower end of the housing leaves enough space at the top of the housing so that the gauge rod openings may be vertically aligned. The housing includes the circular valve seat 146 on which rests the whistle unit 148 which is similar to the unit 112 shown in Fig. 4.

The thicker wall portion 150 which provides room for the gauge rod passage 140 also provides means for anchoring the gauge supporting rod 152. The lower end of rod 152 carries the float rod which through link 154 actuates gauge rod 158.

The upper end of gauge rod 158 is covered by a transparent hood 160 which permits the user to see its upper end 162 so that the level of the tank may be known at any time.

A stop 164 integral with the housing is provided to limit upward movement of whistle unit 148.

In the construction shown in Figs. 1, 2, 7 and 8 the gauge rod passage is such that the gauge rod may be straight to pass through the housing in a vertical direction. In Figs. 4, 5 and 6 the housing is off-set to the right, requiring a corresponding off-set in the gauge rod. In Figs. 1, 2 and 3 the exit opening from the casing or housing is in axial alignment with the entrance opening. In Figs. 4, 5 and 6 the vent pipe opening from the housing is off-set to the right with respect to the entrance passage. In Figs. 7 and 8 the vent pipe passage from the housing is off-set to the left with respect to the entrance passage.

In the two off-set species of Figs. 4, 5 and 6 and Figs. 7 and 8, it will be noted that the larger top area of the housing permits the use of a vent pipe whose internal diameter is at least as large as the entrance passage and the intermediate off-set portion of the passage through the housing is of such area in horizontal cross-section as to be able to provide a passage for fluids past the whistle unit when in raised position which will be at least as large as the entrance to said housing.

In Figs. 7 and 8, the housing expands above the circular threaded portion 165 in an inverted generally conical manner to reach a maximum cross-sectional area at the upper portion 166. The top of the housing is designed to present a relatively wide area in which may be inserted the vent pipe 134 and the lower threaded end of the gauge cover 160.

Thus, there is provided a housing or fitting especially designed in a manner capable of supporting a whistle unit in operative position to function during the filling of the tank and to give an indication when the liquid level has reached a predetermined point and also of carrying a liquid level gauge which will function continuously to indicate the liquid level at any time.

It is my intention to cover all changes and modifications of the example of the invention herein chosen for purposes of the disclosure which do not constitute departures from the spirit and scope of the invention.

I claim:

1. A fitting for installation between a closed tank and a vent pipe in which said fitting and vent pipe are used for venting gas from said tank as the tank is being filled with liquid, said fitting comprising a tubular housing having means at its lower end for engagement with said tank and having means at its upper end for connection with said vent pipe, said housing including a venting passage through which gas entering from the tank may pass into the housing through its lower end and thence through said housing and into said vent pipe through its upper end, said housing adjacent the lower end of said passage having its wall thicker at one side than the other, a vertical opening through said thicker wall adapted to receive a vertically movable gauge rod, a transversely extending valve seat intermediate the ends of said venting passage adapted to receive a valve member thereon, the cross-sectional area of said passage above said valve seat being substantially larger than the cross-sectional area of said passage at said valve seat, the passage through the upper end of said housing to which the vent pipe is connected being substantially smaller in cross-sectional area than the cross-sectional area of said passage above said valve seat, and another opening above the said vertical opening through said thicker wall through which said vertically movable gauge rod may extend upwardly above said housing, said other opening located laterally of the venting passage through the upper end of said housing and being located with respect to said vent pipe where it may be covered by a housing adapted to enclose the upper end of said gauge rod.

2. A fitting for installation between a closed tank for liquid and a vent pipe for venting displaced gas from said tank as the tank is being filled with said liquid, said fitting comprising a tubular housing having means at its lower end for engagement with said tank, a passage through said housing to connect said tank to said vent pipe, said passage being relatively small for a limited distance at the lower entering end of said housing and then being enlarged thereabove to form an intermediate part of said passage substantially greater in cross-sectional area than the cross-sectional area of the lower entering end of said passage, said enlarged part of said passage being laterally offset with respect to said entering end of said passage, an exit part of said passage at the upper end of said housing leading from said intermediate part of said passage to said vent pipe, the upper end of said housing being of sufficiently large area to include the said exit part of said passage which is to be connected with said vent pipe and another vertical opening through which may extend a movable gauge rod, said other opening located to provide a space between it and the said exit end of said passage to permit covering said other opening with a housing, the lower entrance end of said housing having a thickened wall with a vertical bore therethrough, through which the said gauge rod may pass to extend into said tank, and a valve seat between that part of the passage at the lower entering end of said housing and said enlarged intermediate part of said passage.

3. A fitting for supporting a visible gauge and an audible signaling device, said fitting comprising a tubular housing threaded exteriorly at its lower end for engagement with said tank and having means at its upper end for engagement with said vent pipe, said housing including a venting passage of varying cross-sectional areas through which gas may pass from said tank to said vent pipe, said venting passage at its lower end portion having its cross-sectional area offset in respect to said exterior threads to provide a wall at the said lower end portion of said housing that is thicker in horizontal dimension at one side than at the other side, a transversely extending valve seat located at the top of the lower end portion of said venting passage, the cross-sectional area of the intermediate portion of said passage above said valve seat being substantially larger than the cross-sectional area included within said valve seat and leading to an exit portion of said venting passage at the upper part of said housing that is substantially smaller than the said intermediate portion, a substantially vertical bore through the said thicker wall in which may be positioned a gauge rod and another opening through said housing above said vertical bore and laterally disposed from the upper exit portion of said passage and through which said gauge rod may extend, said other opening being located where it may be covered by a housing adapted to enclose the upper end of said gauge rod.

4. A fitting as set forth in claim 3, the said intermediate portion of said passage being laterally offset with respect to the smaller lower end portion of said passage.

5. A fitting as set forth in claim 3, the said exit portion of said passage being offset with respect to the said lower end portion of said passage.

6. A fitting as set forth in claim 3, the said intermediate portion of said passage and the said exit portion of said passage both being laterally offset with respect to the smaller lower end portion of said passage.

7. A fitting for installation between a closed tank and a vent pipe in which said fitting and vent pipe are used for venting gas from said tank as the tank is being filled with liquid, said fitting comprising a housing having means at its lower end for engagement with said tank and having means at its upper end for connection with said vent pipe, said housing having a large open interior, two passages at its lower end leading from said tank to said interior, one of said lower passages being relatively large with respect to the other lower passage and having at its upper end a valve seat, two passages at the upper end of said housing leading away from said interior, one of said upper passages being relatively large with respect to the other and adapted for connection with said vent pipe, the other of said upper passages being directly above the smaller of said lower passages, the larger of said upper passages being laterally disposed with respect to the larger of said lower passages in a direction away from the smaller of said upper passages.

8. A fitting for installation between a closed tank and a vent pipe in which said fitting and vent pipe are used for venting gas from said tank as the tank is being filled with liquid, said fitting comprising a housing having its lower end small enough to be connected with said tank opening, said housing increasing in cross-sectional area upwardly from said lower end and terminating in an upper portion large enough to receive a conventional vent pipe and a gauge housing side by side without interference, a first and a second passage through said housing, said passages having a common intermediate portion of much larger maximum cross-sectional area than the entering and exit ends of the said passages, the first of said passages adapted to vent displaced gas from said tank and having its entering and exit end portions laterally displaced with respect to each other, a valve seat at the upper end of the entering end portion of said first passage, the second of said passages adapted to receive a gauge rod and having its entering and exit ends in substantial vertical alignment with each other.

9. The fitting set forth in claim 7 and having in addition a stop for limiting upward movement of a valve positioned on said valve seat.

10. A fitting for installation between the upper portion of a tank for liquid and a vent pipe for conducting fluid from the tank and for supporting a valve and gauge, said fitting comprising a housing having means on its lower end adapted for engagement with said tank and having means on its upper end adapted for engagement with said vent pipe, said housing having two passages therethrough, the first of said passages being for conducting fluid and having upper, intermediate and lower portions, the minimum cross-sectional area of said lower portion being substantially the same as the internal cross-sectional area of the vent pipe with which the said upper end is adapted for engagement, a transversely extending valve seat at the top of the said lower portion of said first passage, the maximum cross-sectional area of said intermediate portion of said first passage above said valve seat being substantially larger than the cross-sectional area at said valve seat, the cross-sectional area of said upper portion of said first passage being smaller than the cross-sectional area of the said intermediate portion, the second of said passages also extending through said housing in parallel with said first passage and, at its lower and upper ends, being of much smaller cross-sectional area than the minimum cross-sectional area of said first passage, said second passage being adapted to receive a movable gauge rod and to have its upper end sealed against fluid venting without interfering with the movement of said gauge rod.

11. A fitting for installation between the upper portion of a tank for liquid and a vent pipe for conducting fluid from a tank and for supporting a valve and a gauge, said fitting comprising a housing having a lower portion, an intermediate portion and an upper portion, the exterior of the said lower portion being circular in cross-section, the said lower portion having two passages therethrough of unequal cross-sectional areas, the larger of said passages in said lower portion having a cross-sectional area substantially the same as the interior cross-sectional area of the vent pipe to which the said fitting at its upper portion is adapted to be attached, said intermediate portion having a passage therethrough substantially larger than the minimum cross-sectional area of the larger passage in the said lower portion, a valve seat positioned substantially at the lower end of the said larger intermediate portion, said upper portion having two passages therethrough of unequal cross-sectional areas, the larger of said passages in said upper portion being adapted for connection to said vent pipe and being a continuation of the larger passages in the lower and intermediate portions and being substantially less in cross-sectional area at its minimum section than the cross-sectional area of the passage in the said intermediate portion, the smaller of said passages through said lower and upper portions having a passage therebetween and being adapted to receive a movable gauge rod.

12. A fitting for installation between the upper portion of a tank for liquid and a vent pipe for conducting fluid from the tank, said fitting comprising a tubular housing having a lower portion, an intermediate portion and an upper portion, the exterior of said lower portion being circular in cross-section, the said lower portion having two passages therethrough of unequal cross-sectional areas, the larger of said two passages being positioned within said lower portion to provide a thicker wall on one side than on the other and having a cross-sectional area substantially the same as the interior cross-sectional area of the vent pipe to which the said fitting is to be attached, said intermediate portion having a passage therethrough substantially larger than the minimum cross-sectional area of the larger passage in the said lower portion, a valve seat positioned substantially at the lower end of the said larger intermediate portion, said upper portion having two passages therethrough of unequal cross-sectional area, the larger of said passages in said upper portion being a continuation of the larger passages in the lower and intermediate portions and being substantially less in cross-sectional area than the cross-sectional area of the passage in the said intermediate portion, the smaller of said two passages through said lower portion extending vertically through said thicker wall and the smaller of said passages through said upper portion extending vertically, said smaller passages being adapted to receive a movable gauge rod.

13. A fitting for installation between the upper portion of a tank for liquid and a vent pipe for conducting fluid from the said tank, said fitting comprising a housing, means for connecting the housing to the tank at an opening through the tank wall, a main venting passage through said housing having an entrance and an exit each of substantially smaller cross-sectional area than the largest cross-sectional area of the intermediate portion of said passage, said exit having its axis off-set with respect to the axis of the entrance, two vertically spaced smaller passages through the housing for a gauge rod, the lower of said smaller passages being laterally disposed with respect to the entrance of said main venting passage and extending from the lower end of the said housing to merge with the intermediate portion of said main venting passage, the upper of said smaller passages leading from the intermediate portion of said main venting passage through the upper part of said housing and laterally disposed from said main venting passage exit a distance greater than the lateral disposition of said lower smaller passage from said main venting passage entrance, the axes of all said passages at their entrances and exits to and from said housing being substantially parallel and a valve seat between the entrance and the larger intermediate portion of said main venting passage.

14. A fitting for installation between the upper portion of a tank for liquid and a vent pipe for conducting fluid from the said tank, said fitting comprising a tubular housing threaded exteriorly at its lower end and including a venting passage enlarged in its intermediate portion and through which fluid may pass from said tank to said vent pipe, said venting passage at the lower end of said housing having its cross-sectional area off-set with respect to the said exterior threads to provide a thickened wall at one side of the lower end of said housing, said venting passage at its upper exit end being circular and having its cross-sectional area off-set with respect to the cross-sectional area of the venting passage at the lower end of said housing, a vertical hole through said thickened wall, a hole larger than said vertical hole through the top of said housing laterally disposed from the upper exit end of said venting passage, said vertical hole and said larger hole being adapted to receive a movable indicator element and a valve seat between the lower end of said passage and the enlarged intermediate portion of said passage.

References Cited in the file of this patent

UNITED STATES PATENTS

| | | |
|---|---|---|
| 435,742 | Fox | Sept. 2, 1890 |
| 1,192,134 | Stevens | July 25, 1916 |
| 1,372,466 | Whoolery | Mar. 22, 1921 |
| 1,626,789 | Creed | May 3, 1927 |
| 2,387,011 | Zerner | Oct. 16, 1945 |